Figure 1:
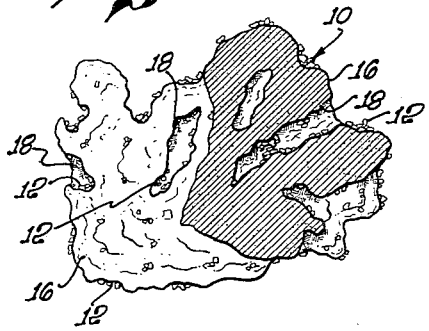

Oct. 2, 1956    F. F. HORNE    2,765,291
PUMICE-CONTAINING COMPOSITION FOR TREATING SOIL
Filed Jan. 6, 1953.

FREDERICK F. HORNE,
INVENTOR.

BY
Barthelew & Scantlebury
ATTORNEYS.

ion in the soil. The treating agent may thereby be made
effective in the soil over a relatively long period of time.

United States Patent Office 2,765,291
Patented Oct. 2, 1956

2,765,291

PUMICE-CONTAINING COMPOSITION FOR TREATING SOIL

Frederick F. Horne, Carmel Valley, Calif.

Application January 6, 1953, Serial No. 329,880

6 Claims. (Cl. 260—41)

This invention has to do generally with the problem of introducing chemical agents into the soil in a convenient and effective manner. Many agents for amending and conditioning the soil need to be added in concentrations that are extremely small and yet accurately determined. Under such conditions it may be extremely difficult to obtain sufficiently uniform distribution of the agent in the soil. By first thoroughly mixing the agent with a definite proportion of a less active substance, known as an extender, the distribution of the agent throughout the soil may be rendered more uniform and reliable. However, it has been difficult in the past to obtain satisfactory materials for use as extenders.

In accordance with one aspect of the present invention, the agent to be extended is employed in relatively finely divided solid form, and is extended with relatively coarse granular natural pumice. An important advantage of natural pumice for that purpose is the presence of a large number of small pores or channels, of both macroscopic and microscopic dimensions, that open inwardly from the surface of each particle. A further important characteristic of natural pumice is the unique type of surface roughness that it exhibits, both on the exterior surfaces of pumice particles and on the inner surfaces within the pores. It has been discovered that when pumice is thoroughly mixed with a solid granular substance of suitable, relatively fine grain size, the grains of the substance tend to adhere to the rough pumice surface and to become trapped in pores of the pumice. Thus, by utilizing pumice as an extender for soil conditioning agents, the relationship between agent and extender is more intimate than that of an ordinary mixture. An appreciable, and preferably a major, portion of the agent becomes firmly attached to individual pieces of pumice.

That unique association tends to prevent mutual segregation of the agent and the extender, not only during transportation and storage, but also while the composition is added to, and mixed with, the soil. The invention thereby leads to a more uniform distribution of the agent in the soil, and prevents formation of deposits in which the concentration of the agent is unduly high.

In accordance with another aspect of the invention, the soil conditioning agent may be combined in liquid form with the extending pumice. For example, the agent may be in the form of a solution in a solvent that is evaporable, such as water. The agent may then be deposited on the surface and in the pores of the pumice by saturation of the pumice with the solution, followed by evaporation of the solvent. Further, a soil treating or conditioning agent in liquid form may be effectively extended with pumice by saturating the pumice with the liquid agent, causing an appreciable portion of the liquid to enter pores of the pumice, and adding the resulting composition to the soil with the agent still in liquid form. An advantage of that aspect of the invention, beyond facilitating uniform distribution of the agent throughout the soil, is that a part of the liquid tends to be retained for relatively long periods within the pumice pores, being transferred only gradually to the soil solution or to waters used for irrigation in the soil. The treating agent may thereby be made effective in the soil over a relatively long period of time.

The amount of agent that is taken up and held by a given weight of pumice may be controlled in accordance with the desired dosage. A particularly useful factor in exercising such control is the screen size of the pumice particles. That is in sharp contrast to the situation with previously available extending materials. Ordinarily it has been necessary to employ an extender that has substantially the same screen size as the agent to be extended, in order to reduce to a minimum the tendency of the two components of the mixture to segregate during handling. However, the newly discovered ability of pumice particles to hold the extended agent firmly on its surface and in its pores permits a very wide variation in the ratio of particle sizes of the two components. It is preferred that the pumice particles have an average size considerably larger than that of the agent to be extended. However, since the screen size of the agent may be, and ordinarily is, extremely small, that leaves a wide range conveniently available within which the screen size of the pumice may be selected.

It has been found that in general the smaller the screen size of the pumice the larger the proportion of agent it will take up in the intimate association that has been described. It is therefore possible, for an agent of given characteristics, to controllably determine within quite wide limits the proportion of agent to pumice that will be stable in the final composition by selection of the appropriate particle size for the extending pumice.

A further important advantage of pumice as an extender results from the fact that it is substantially inert chemically. It therefore has little or no tendency to react chemically with soil conditioning agents in a manner to transform the agent into insoluble, or otherwise unavailable, form.

The invention affords the further advantage that natural pumice is, itself, a valuable additive to substantially all soils that require extensive amendment. For that reason a double advantage is provided by its use as an extended. And, particularly with certain types of chemical agents, the continuing proximity of the agent and the extending pumice even after their distribution through the soil has been found to provide enhanced effectiveness to both.

A full understanding of the invention, and of its further objects and advantages, will be had from the following description of certain illustrative manners of carrying it out and of typical results it may provide. The accompanying drawings are a part of that description. In the drawings:

Fig. 1 is a schematic view, partly in section, of a typical granule of pumice having a soil treating agent adhering to it in accordance with one aspect of the invention; and Figs. 2–5 are diagrams illustrating results of a baking test on soil with various additives.

The present description is merely illustrative of the invention, and is not intended to imply any limitation of its scope, which is defined in the appended claims.

In preferred form of the invention, the pumice is first brought together with an excess of the agent to be extended, and thoroughly mixed in any suitable manner that brings the agent into contact with substantially the whole of the surface of the pumice particles. A portion of the agent, whether in finely divided solid form or in the form of a liquid, is thereby adhered to the rough pumice surface, partly on the exterior of the pumice particles and partly within the pores that open inwardly from the outer surface of the pumice. The remaining excess of agent is then removed, as by screening, and the solvent, if any, may be removed by evaporation. It has been found that a composition prepared in that manner is remarkably stable. Even prolonged and vigorous shaking does not disturb the unique association of the agent and the individual particles of pumice.

Fig. 1 represents, somewhat schematically, the manner in which grains of a soil treating agent adhere to the pumice. A typical pumice particle, roughly $3/16$ inch in diameter, is indicated at 10. Particles of soil treating agent a few mils in diameter are shown at 12, adhering to the rough pumice surface 16 and within crevices and pores 18 that open inwardly from the pumice surface.

Many different types of soil conditioning agents can be usefully extended by means of granular natural pumice. Concentrated soil nutrients and chemical fertilizers that are required in relatively small quantity in the soil and that may be provided in finely divided solid form can be effectively combined with natural pumice in the manner indicated. For example, fertilizers such as the trace elements iron, manganese, zinc, boron, copper and potassium, where deficient in the soil, may be required to be added to the soil in concentrations of only a minor fraction of 1 percent to 1 or 2 percent. Such materials in relatively finely divided form may be first mixed with natural pumice in suitable proportions, for example from about 1:10 to 1:1000, depending upon such factors as grain size and the desired final concentration of the agent in the soil. The mixture of pumice and agent may then be added to the soil in any desired concentration, for example from about 0.1 to about 10 percent. Under certain conditions, for example for use in septic tank drainfields, it may be desirable to add the mixture of pumice and agent to the soil in concentrations of as much as 50 percent or more by volume.

Insecticides such, for example, as hexachlorocyclohexene (Lindane), fungicides and soil sterilizing agents such as formaldehyde, calcium chloracetate and the chlorinated hydrocarbons, for example the mixture of 1,2- and 1,3-dichloropropene known as DD, may usefully be extended with natural pumice. Agents of the latter type have been found to control root-attacking nematodes and to give very considerable increases in crops when added at the rate of a few hundred pounds per acre. Compositions comprising such agents extended with pumice may be mixed with the soil or may be employed, for example, as a mulch on the surface of the soil. Terms such as "soil additive," "soil corrective," "soil conditioner" and "soil treatment" are intended to include such application of soil treating agents to the soil surface, for example, as well as its introduction into the body of the soil.

Soil treating agents of the types indicated, which are at least slightly water soluble, are gradually released from the pumice pores by the moisture in the soil. Those portions of the agent that are most deeply embedded in the pumice pores are found to be removed by solution relatively slowly, so that even after direct and repeated leaching of the combination of pumice and a water soluble agent, an appreciable proportion of the agent remains in the composition. Such delay in releasing a treating agent into the soil may be highly advantageous in extending the period of effectiveness of any one treatment. Much the same advantage applies also with chemical agents that are not water soluble, or that are soluble only to a negligible extent. Such agents may become available to plants by chemical reaction produced by the plant roots or by bacterial action, for example. Such action tends to be slowed down, and the effectiveness of the soil treatment prolonged, when an appreciable portion of the agent is enclosed within pumice pores.

The invention is particularly effective in connection with soil conditioning agents, such as synthetic organic polyelectrolytes, which improve soil structure by the production of aggregates. Such soil aggregating agents, although occasionally used under special conditions at concentrations as high as 2 percent, are ordinarily required in particularly small concentrations, typically from about 0.02 to about 0.2 percent. Under typical conditions concentrations in excess of 0.2 percent may actually be harmful, and may readily occur if the agent is permitted to accumulate locally in excessive concentration. Uniform distribution of the agent throughout the soil to be treated is therefore of paramount importance with such conditioning or treatment agents. For, if the materials are accumulated locally in excessive concentrations, for example as a result of improper distribution throughout the mass of the soil, they can be harmful; and in too small an application, be of little benefit. Hence, it is of particular importance that application of these minute quantities of agents to large volumes of soil be done in a manner that permits accurate control of the distribution. Such control may be effectively provided by extending the agents with pumice.

Moreover, it has been found that the effectiveness of such soil aggregating agents may be considerably enhanced when they are added to soil in intimate association with pumice. It appears that the capacity of the synthetic organic polyelectrolytes to produce soil aggregation is not reduced by the initial enclosure of the electrolyte within pores of the pumice, but is, if anything, increased; and the utility of such aggregates in promoting good soil structure appears to be improved by their location in the immediate vicinity of particles of pumice in the soil. Furthermore, the beneficial effects of the pumice upon the soil, such as improved moisture absorption and transport, and retention of air by the soil when temporarily flooded, are enhanced and rendered more useful when each pumice particle is directly surrounded by soil that has been effectively aggregated. That mutually favorable relationship is insured by introducing the aggregating agent into the soil in direct association with the individual pumice particles.

Whereas it is ordinarily preferred to combine the pumice and the agent to be extended by mixing them in dry form, the agent may alternatively be first dissolved in a suitable solvent, such as water. The resulting solution may then be brought into contact with the pumice, as by spraying, for example, preferably with addition of a wetting agent. The solution then tends to penetrate pores of the pumice. The resulting composition may be added directly to the soil. Alternatively, and preferably, the agent may be deposited as a finely divided solid on the surface of the pumice, and particularly in its pores, by evaporation of the solvent. Water soluble fertilizers may be combined with pumice in that manner. The synthetic organic polyelectrolytes that consist of a polymer or a salt of a polymer comprising predominantly acrylic or methacrylic radicals are available commercially in solution and may be applied to the soil in association with pumice in definitely controlled concentrations. Such polyelectrolytes are typically used at concentrations of the order of 0.05 percent, and are effective agents for producing aggregation of the elemental soil particles and thereby improving the soil structure.

The remarkable ability of pumice to retain a chemical agent in finely divided solid form is indicated by tests which have been carried out specifically with a synthetic organic polyelectrolyte consisting essentially of vinyl acetate-maleic anhydride copolymer. That type of polyelectrolyte is commercially available in finely divided solid form under the trade name "Krilium." A surplus of that polyelectrolyte, having a grain size of approximately one mil, was mixed dry with natural pumice that had been screened to pass a ¼ inch screen and to be held by a ⅛ inch screen. After thorough agitation of the pumice and polyelectrolyte, the mixture was shaken briefly on a relatively fine screen of approximately $1/16$ inch mesh to remove the particles of polyelectrolyte that were still free.

Table 1 shows, for typical independent samples, the initial weight in grams of each sample of pumice in column A, and the weight of polyelectrolyte held by the pumice after that initial screening of the mixture in column B. Columns C and D show the weight of polyelectrolyte retained after continued shaking on a 1/16 inch screen for additional periods of 2 hours and 4 hours, respectively.

Table 1

|   | A Pumice | B Initial Agent | C 2 Hrs. | D 4 Hrs. | E Final Agent, Percent |
|---|---|---|---|---|---|
| 1 | 17.027 | 0.288 | 0.231 | 0.230 | 1.33 |
| 2 | 18.567 | 0.315 | 0.281 | 0.281 | 1.49 |
| 3 | 20.131 | 0.341 | 0.307 | 0.307 | 1.52 |
| 4 | 24.414 | 0.413 | 0.379 | 0.379 | 1.53 |
| 5 | 24.033 | 0.406 | 0.391 | 0.366 | 1.50 |
| 6 | 30.843 | 0.522 | 0.496 | 0.496 | 1.58 |
| Aver. | 22.502 | 0.381 | 0.347 | 0.343 | 1.50 |

In that test, the first 2 hours of shaking, following the brief initial sifting, removed on the average only nine percent of the initially carried polyelectrolyte; and an additional 2 hours of shaking removed only one percent. A further two hours of shaking, not represented in the table, produced no measurable change in the weight of agent mechanically bound to the extender. The average amount of agent retained at the end of the test comprised 1.50 percent of the composition, and the proportions of agent to extender were remarkably constant from one sample to another particularly in view of the relatively small number of pumice particles in each sample.

The described test treatment of shaking on an open screen that will pass one component and not the other is, of course, a far more rigorous test of segregation than would correspond to any normal conditions of storage and shipment, particularly since under actual conditions any particle of the agent released from one pore of the pumice would normally be retained in the container and would be likely to become lodged in another pore of the pumice. The results obtained show a remarkable tendency of the mixture of pumice and finely divided agent to reach an equilibrium proportion from which it is not displaced even by prolonged and vigorous shaking. That behavior is in sharp contrast to the tendency of most granular mixtures to become segregated upon agitation.

The percent of a given agent that is firmly retained by the pumice, 1.50 percent under the particular conditions of the described illustrative tests, varies with the screen size of pumice used, becoming larger as that screen size is decreased. That effect is believed due primarily to the greater surface area, and hence the greater number of exposed pores, that are available per unit weight of pumice in the smaller screen sizes. Since the adherence of the agent to the rough pumice is essentially a surface effect rather than a volume effect, the proportion of agent to extender in a stable composition of the type described can be regulated, according to the available surface of the extending material. A relatively high proportion of agent to extender can be attained, when desired, by reducing the particle size of the pumice to a magnitude that will give the largest practicable area of pumice surface. On the other hand, when a small proportion of agent to total composition is desired, pumice of relatively large screen size can be used, which gives less surface area per unit volume of pumice, thereby reducing the proportion of agent that can adhere stably to the pumice. Whereas that type of control of the stable composition proportions is useful throughout a range of pumice particle diameters from about 0.002 to about one inch, it is ordinarily preferred that the pumice particles have an average diameter from about 1/16 to about 3/8 inch.

Furthermore, in pumice of the larger screen sizes the average pore size is believed to be larger, and hence to accommodate agents in less finely divided conditions. The pore size and the number of pore openings per unit of surface area vary considerably with the grade and origin of the pumice, but are relatively uniform within any one type. Accordingly, the behavior of any one soil conditioning agent with relation to a given type of pumice can readily be determined. In a typical lot of pumice, pore sizes were found to vary from about 0.002 to about 0.05 inch in diameter, though it will be understood that their shape is ordinarily irregular.

The effectiveness of the polyelectrolyte in aggregating soil has been found to be undiminished by the described association with pumice, and it is believed to be appreciably increased. Baking tests have been carried out with three widely different types of soil to determine the degree of flocculation and surface aggregation of treated soils. A thin water paste was made of the soil, with and without additive. The wet paste was distributed in a thin layer on a drying tray and was then baked for one hour at 110° C. A qualitative measure of the soil flocculation that had been produced by the additive was obtained by comparing the size, number and distribution of the surface cracks produced in the several samples by the baking. The degree of surface aggregation was determined by measuring the weight of surface particles which could be removed from the baked surface with a camel's hair brush under uniform pressure. The aggregated soil particles show less tendency than the untreated soil to become cemented together by the baking, thus leading to a greater "brush weight." Both the qualitative nature of the surface patterns and the brush weight were consistently reproducible for each type of soil and treatment, for the particular controlled conditions of the tests.

Figure 2:
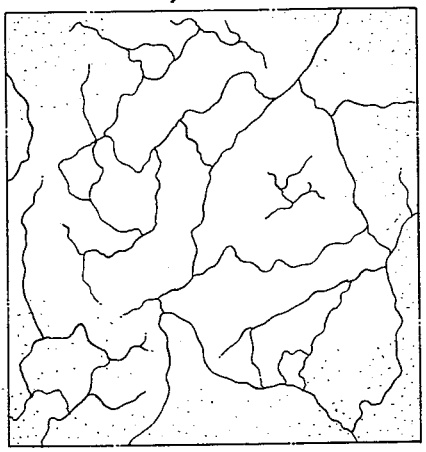
Figure 3:
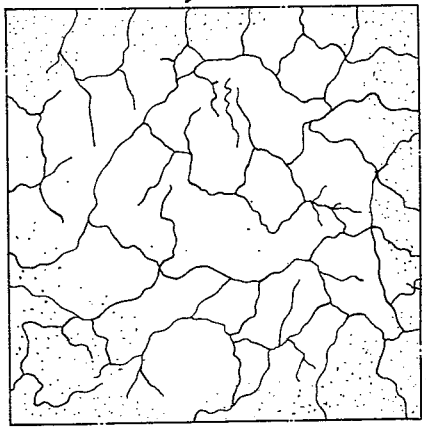

Figs. 2–5 are illustrative. They represent typical patterns actually observed for a particular clay soil of calcareous type of relatively high salt concentration and giving a hydrogen ion reaction corresponding to pH 8.2. Fig. 2 represents the pattern of surface cracks obtained in a sample of such soil without additive; Fig. 3 with addition of 0.05 percent of the synthetic organic polyelectrolyte already described, and known as Krilium; and Figs. 4 and 5 with addition of an amount of an intimate mixture of pumice and Krilium calculated to correspond to 0.05 percent polyelectrolyte.

Figure 4:
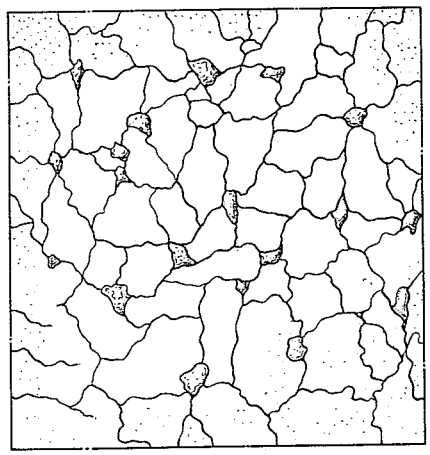
Figure 5:
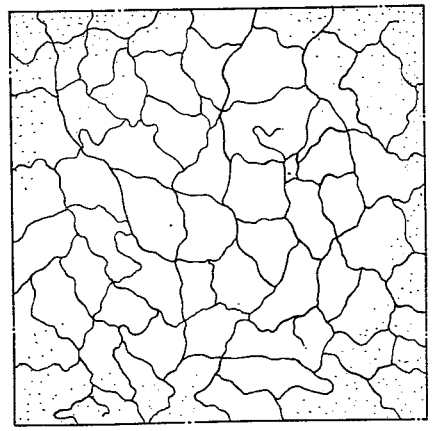

The soil with additive was in each instance given a preliminary treatment prior to the described baking test to permit the polyelectrolyte to react with the soil particles. The soil and additive were thoroughly mixed, and the several mixtures were then sprinkled with distilled water to the saturation point and were placed in the sun to dry. When air dry, each sample was broken up by crushing to produce a free-flowing soil, but without breaking up the secondary aggregates. The resulting product was then combined with water to form the thin paste and baked as already described. In the case of Fig. 5 the added pumice was removed from the soil by screening after the described preliminary treatment and before the baking. For Fig. 4 the added pumice remained in the sample throughout, and a number of pumice granules are seen in the resulting pattern. It is interesting that the pumice particles appear to become junction points of the system of surface cracks. Figs. 3, 4 and 5 clearly represent more satisfactory soil conditions than the control sample of Fig. 2. Furthermore, as compared to the addition of polyelectrolyte alone (Fig. 3) the addition of the polyelectrolyte in association with pumice provides an appreciable additional improvement, both when the pumice remains in the soil (Fig. 4) and even when the pumice is removed after the aggregating action of the polyelectrolyte has taken place and prior to the baking test (Fig. 5).

Results of the brush test on samples prepared and baked as has been described are given in Table 2. The numbers represent the weight in grams of material removed by brushing a standard area of the baked surface with a camel's hair brush under uniform conditions of pressure and number of brush strokes.

Table 2

|   | Preparation | Soil I | Soil II | Soil III |
|---|---|---|---|---|
| A | Control, no additive | 0.07 | 0.02 | 0.008 |
| B | Soil + 0.05% polyelectrolyte | 0.30 | 1.15 | 0.05 |
| C | Soil + 0.05% polyelectrolyte, with pumice. | 0.21 | 0.19 | 0.03 |
| D | Same as C, pumice removed | 0.40 | 0.33 | 0.05 |

In Table 2, soil I is the same light clay soil already described in connection with Figs. 2–5. Soil II is a non-calcareous loam having low salt concentration and high silt content and giving a hydrogen ion reaction corresponding to pH 7.2. Soil III is a non-calcareous heavy clay soil of low salt concentration and pH 5.4. The several methods of soil preparation designated A, B, C and D are the same as those already described for Figs. 2, 3, 4 and 5, respectively.

As shown in Table 2, the addition of polyelectrolyte, whether added alone or in association with pumice, increases the brush weight of each soil tested by a factor of from about 3 to about 6. In the case of soil II that factor is of the order of 10 for electrolyte in association with pumice. All of those results represent a definite improvement in soil properties. On the other hand, the relatively high brush weight of 1.15 produced in soil II by addition of polyelectrolyte alone represents an excessive granularity of the soil. That excessive effect is avoided for soil II by adding the polyelectrolyte in association with pumice. That result illustrates the general ability of pumice, when employed in accordance with the invention, to limit the potentially harmful effects that may otherwise be produced by excessive concentration of polyelectrolyte. Such excessive concentration may be produced locally by incomplete distribution of polyelectrolyte in the soil, or may be produced generally, as in the present instance, by a dosage that is greater than required for the particular soil in question. Both types of excess tend to be prevented, or their harmful effects avoided, by adding the polyelectrolyte in association with pumice. Yet that association does not prevent normal, or even improved, action by the correct dosage of polyelectrolyte.

I claim:

1. A composition of matter for the treatment of soil, consisting essentially of a major proportion of granular natural pumice and a relatively minor proportion of a synthetic organic polymeric polyelectrolyte consisting essentially of vinyl acetate-maleic anhydride copolymer capable in the presence of water of causing aggregation of soil particles, an appreciable portion of the said polyelectrolyte being contained in pores of the pumice.

2. A composition of matter as defined in claim 1 and in which the mean screen size of the pumice is between about ⅛ inch and about ⅜ inch, the composition containing between about 1 percent and about 2 percent of polyelectrolyte.

3. The method of extending a solid granular synthetic organic polymeric polyelectrolyte consisting essentially of vinyl acetate-maleic anhydride copolymer to produce a composition having an effectively stable predetermined ratio of polyelectrolyte to extender approximating one to seventy, said method comprising contacting an excess of polyelectrolyte having a grain size of approximately one mil with substantially the whole of the available surface of granular natural pumice having an average screen size between about ⅛ inch and ¼ inch to adhere a portion of the polyelectrolyte to that surface, and separating the unadhered polyelectrolyte from the adhered pumice and polyelectrolyte.

4. The method of extending a solid granular soil treating agent to produce a composition having an effectively stable predetermined ratio of agent to extender between about 1:10 and about 1:1000, said method comprising contacting an excess of the agent in finely divided solid granular form with substantially the whole of the available surface of granular natural pumice to adhere a portion of the agent to that surface, the pumice being of a screen size that is between about 1/16 inch and about one inch and is predetermined in accordance with the said ratio to adhere only substantially the said ratio of agent, and separating the excess unadhered agent from the mutually adhered pumice and agent.

5. The method of extending a solid granular soil treating agent to produce a composition having an effectively stable ratio of agent to extender and thereby to facilitate substantially uniform distribution of the agent in predetermined proportions in soil, said method comprising contacting a relatively minor proportion of the agent in finely divided solid granular form with the surface of a relatively major proportion of granular natural pumice having a screen size between about 1/16 inch and about one inch to adhere the agent in firmly adhering and substantially non-segregating relation to the pumice.

6. The method of extending a solid granular soil treating agent to produce a composition having an effectively stable ratio of agent to extender, said method comprising contacting an excess of the agent in finely divided solid granular form with substantially the whole of the available surface of granular natural pumice having a screen size between about 1/16 inch and about one inch to adhere a portion of the agent to that surface, and separating the excess unadhered agent from the mutually adhered pumice and agent.

References Cited in the file of this patent
UNITED STATES PATENTS

| 2,623,003 | Friedlob et al. | Dec. 23, 1952 |
| 2,695,840 | Leppla | Nov. 30, 1954 |